July 5, 1949.  F. A. LANE  2,475,033
MECHANICAL MOVEMENT

Filed Sept. 22, 1945  2 Sheets-Sheet 1

INVENTOR.
FRED A. LANE,
BY
Hood & Hahn
ATTORNEYS.

July 5, 1949.　　　　　　　F. A. LANE　　　　　　2,475,033
MECHANICAL MOVEMENT
Filed Sept. 22, 1945　　　　　　　　　　　　2 Sheets-Sheet 2
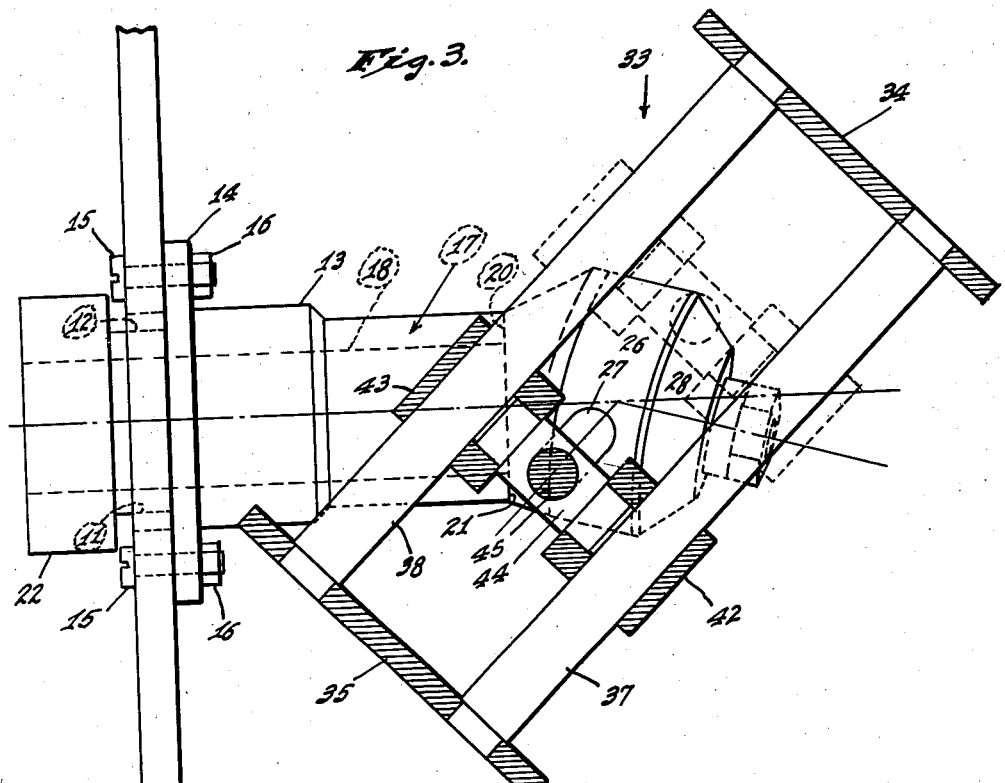
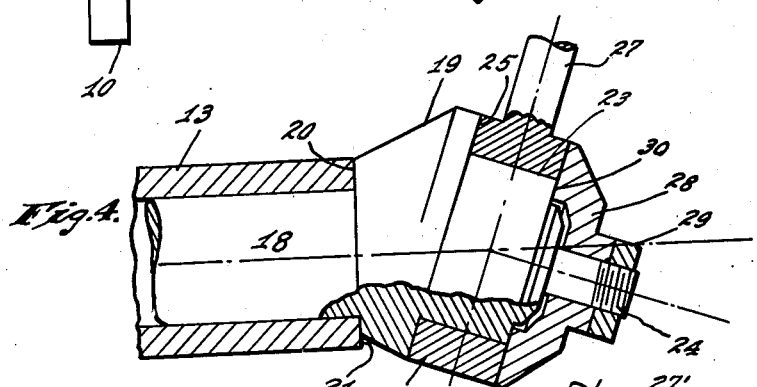
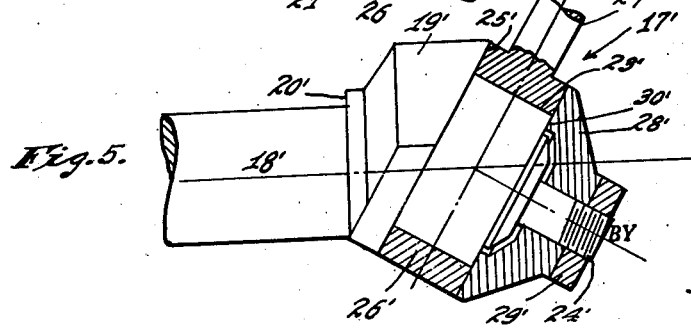
INVENTOR.
FRED A. LANE,
BY
Hood & Hahn
ATTORNEYS.

Patented July 5, 1949

2,475,033

UNITED STATES PATENT OFFICE 2,475,033

MECHANICAL MOVEMENT

Fred A. Lane, Shelburn, Ind., assignor to Lane Motors, Inc., Terre Haute, Ind., a corporation of Indiana Application September 22, 1945, Serial No. 618,041

2 Claims. (Cl. 74—60)

The present invention relates to a mechanical movement of the reversible motion-transmitting type, comprising a rotary element, a reciprocable element, and means interconnecting said elements in such a fashion that when one of said elements is driven from an external power source, the motion of the element so driven will be converted into motion of the other of said elements. Thus, the movement of my invention may be used to convert the reciprocation of the piston or pistons of an expansible fluid engine or of an internal combustion engine into rotation of a power output shaft; or it may be used to convert the rotary motion of an engine or motor output shaft into reciprocation of the piston or pistons of a pressure or exhaust pump; but it is to be understood that these illustrative suggestions are by way of example only, and that my invention resides in the details of construction of the mechanical movement disclosed herein, and not in any selected manner of its use.

The primary object of the present invention is to provide an improved mechanical movement capable of converting rotary motion into reciprocatory motion, or vice versa. A further object of the invention is to provide, in such a device, structural features which will cause movement of the reciprocating element from one end of its stroke to the other to be accompanied by rotation of the rotatable element through a predetermined number of degrees, while return movement of the reciprocating element to said one end of its stroke will be accompanied by rotation of the rotatable element through a different number of degrees. A further object of the invention is so to arrange the parts that, if the plane of movement of the reciprocating element is shifted, with relation to the axis of the rotating element, the relationship between the degrees of rotation of the rotating element accompanying the reciprocations of the reciprocating element in its opposite directions will thereby be varied. A further object of the invention is to provide a motion converter of the type under consideration in which a guide determines the line of reciprocation of the reciprocating element; and in which said guide is adjustable about an axis perpendicular to the axis of rotation of the rotatable element. A further object of the invention is to provide such a structure in which adjustment of the line of reciprocation of the reciprocable element relative to the axis of rotation of the rotatable element results in a variation in the length of the stroke of the reciprocable element, as well as a variation in the relationship between the degree of rotation of the rotatable element accompanying movement of the reciprocable element from one end of its stroke to the other, and the degree of rotation of the rotatable element accompanying return movement of the reciprocable element to said one end of its stroke. Still further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 3 is a plan view of the structure as shown in Fig. 1, parts being shown in section for clarity of illustration;

Fig. 4 is an elevation, partly in section, of the rotatable element of my motion converter; and Fig. 5 is a similar view of a somewhat modified form of rotatable element for use in my mechanical movement.

Figure 1:
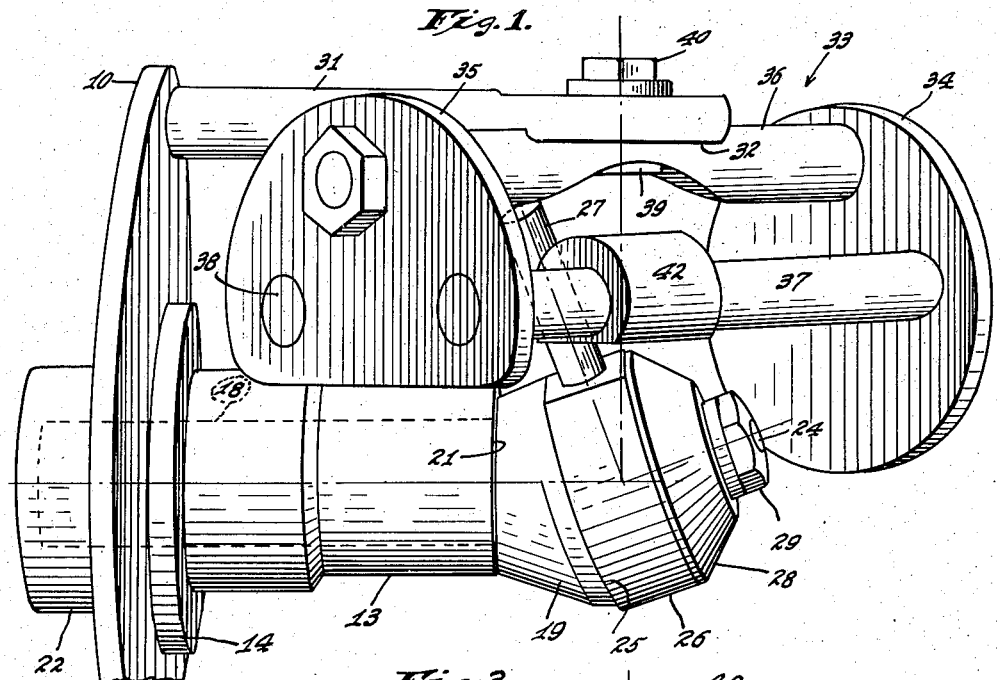
Fig. 1 is a perspective view of an embodiment of my invention in one position of operation.

In the present disclosure, no attempt is made to illustrate, or to describe specifically, any practical application of my invention; but instead I have merely shown an illustrative embodiment of the mechanical movement whereby rotary motion may be converted, under the conditions above outlined, to reiiproratory motion, and whereby reciprocatory motion may alternatively be converted to rotary motion.

In such illustrative embodiment, the reference numeral 10 indicates a base plate upon which the mechanical movement is supported. Said plate is formed with a central opening 11 in which is mounted a reduced extension 12 of a bearing sleeve 13 formed with a flange 14 which bears against a face of said plate 10 and is secured in place by screws 15 and nuts 16, or other equivalent fastening means. Journalled in the sleeve 13 is a rotor, indicated generally by the reference numeral 17, and comprising a shank 18 and a head 19. The head 19 is enlarged to define an annular shoulder 20 adapted to bear against the outer end 21 of the sleeve 13, and a wheel 22 (which, in a practical embodiment of the invention, may be a pulley or a gear or a coupling element) is secured in any suitable fashion, as by a driving fit, to that end of the shank 18 projecting beyond the reduced extension 12 of said sleeve; whereby the rotor 17 is held substantially against axial movement relative to the sleeve 13.

The axis of the shank 18 is, of course, coincident with that of said sleeve, but the axis of the head 19 meets the axis of said shank in an acute angle, which may have almost any value less than 90° and more than 0° but which I now believe should preferably be between 20° and 40° for optimum performance. Said head is formed with a reduced peripheral bearing surface 23 centered on said head axis; and a threaded stud 24 projects, in the illustrated embodiment of the invention, beyond the outer end of said reduced head portion. Journal mounted on said surface 23 and bearing against the outwardly-facing shoulder 25 formed by the reduction, is a ring 26 carrying a post 27 projecting radially outwardly from said ring. A disc 28, centrally perforated to pass the stud 24, is mounted on said stud and held in place thereon by a nut 29, said disc bearing against the outer surface 30 of the reduced portion of the head 19, and the width of the ring 26 being such that it has a free-running fit between the shoulder 25 and the disc 28 without being capable of any material axial movement relative to the head 19.

Mounted upon the plate 10 with its axis in the vertical plane including the axis of the rotor 17 is a bar 31, said bar having a flattened region 32 in the neighborhood immediately above the surface 23. A cage 33, including a pair of end plates 34 and 35 joined by rods 36, 37, and 38, is supported upon said bar 31 by a headed screw 39 passing upwardly through the rod 36 and through a suitable opening in the region 32 of the bar 31 and receiving, above said bar 31, a nut 40 whereby said cage may be clamped fixedly in any suitable position of adjustment relative to the bar 31, and thus relative to the axis of the rotor 17.

Reciprocably mounted upon the rods 37 and 38 is a guide, indicated generally by the reference numeral 41. Said guide comprises a block 42 having a snug-sliding fit on the rod 37, and a block 43 having a similar fit on the rod 38, said blocks being joined by a pintle 44, whose opposite ends are journalled in said respective blocks 42 and 43 upon an axis perpendicular to said rods 37 and 38. Said pintle is medially formed with a transverse bore 45, in which may be guidingly received the post 27.

It will be seen that, with the nut 40 tightened, the cage 33 acts to restrict the slide 41 to rectilinear reciprocation in a line determined by the adjusted position of the cage, that the engagement of the post 27 in the bore 45 restricts said post to oscillation in a plane including the line of reciprocation determined by such position of the cage, that when said post so oscillates, its movement must be accompanied by an orbital rotation of the head 19 about the axis of the shank 18, and that the characteristics of such rotation will be determined (for any selected position of the cage 33) by the angle defined between the axis of the shank 18 and the axis of the surface 23 of the rotor 17.

Figure 2:
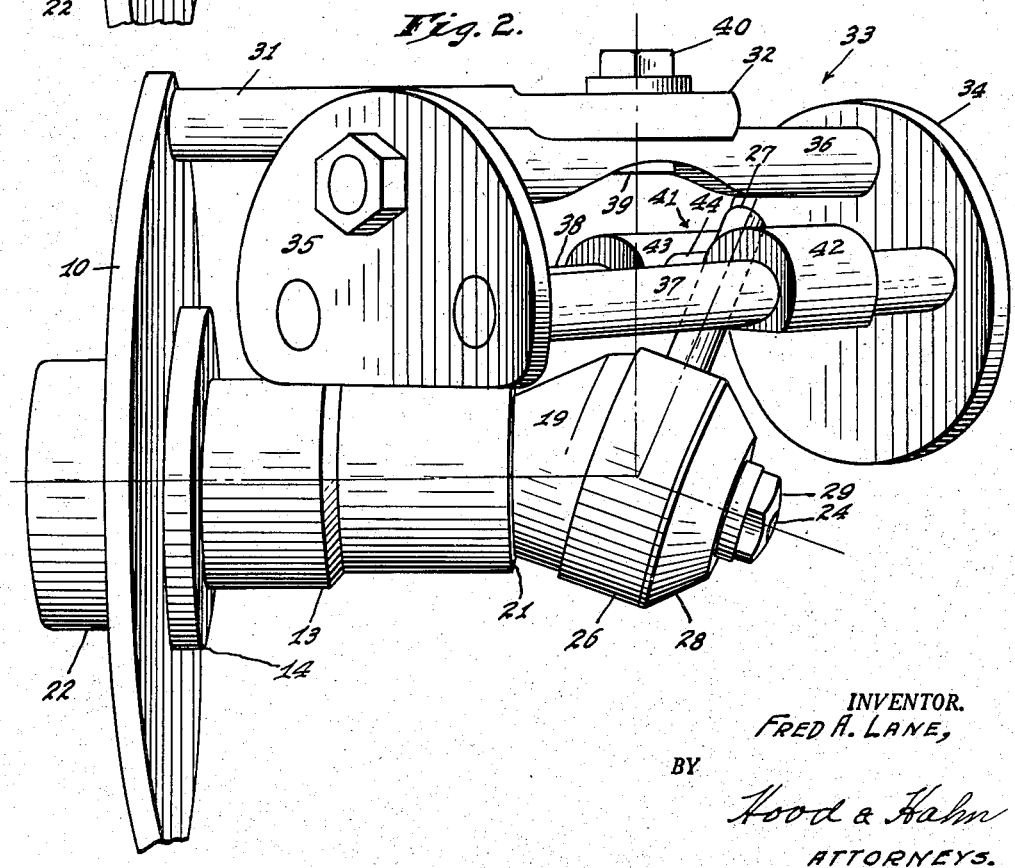
Fig. 2 is a similar view thereof with the parts in another position.

In the embodiment of my invention illustrated in Figs. 1-4, the angle defined between the axis of the shank 18 and the axis of the surface 23 is 20°. Using that rotor, suitable motion conversion can be effected with the cage 33 set in any position between that illustrated, in which the angle defined between the axis of the shank 18 and the line of reciprocation of the guide 41 is 46°, through a position in which said line is parallel with said axis, to a position in which said line, located on the opposite side of said axis from that illustrated, defines therewith an angle of 46°.

In Fig. 5, I have illustrated a rotor 17' similar in all respects to the rotor 17 except for the angle defined between the shank axis and the axis of the journal surface, which, in the rotor of Fig. 5, is 30°. Said rotor 17' comprises a shank 18' receivable in the sleeve 13 and a head 19'. Said head is enlarged to define a shoulder 26' adapted to bear against said sleeve end 21, and said head is formed with a reduced peripheral bearing surface 23' centered on the axis of said head; and a threaded stud 24' projects beyond the outer end of said reduced portion. Journal mounted on said surface 23' and bearing against the outwardly facing shoulder 25' formed by the reduction, is a ring 26' which, of course, carries a post 27' like the post 27. A disc 28', centrally perforated to pass the stud 24', is mounted on said stud and held in place thereon by a nut 29', said disc bearing against the outer surface 30' of the reduced portion of the head 19', and the width of the ring 26' being such that it has a free-running fit between the shoulder 25' and the disc 28' without being capable of any material axial movement relative to the head 19'.

Using the rotor of Fig. 5, suitable motion conversion can be effected with the cage 33 set in any position between that in which the angle defined between the axis of the shank 18 and the line of reciprocation of the guide 41, located on one side of said axis, is 40°, through a position in which said line is parallel with said axis, to a position in which said line, located on the opposite side of said axis, defines therewith an angle of 40°.

Thus, with the rotor of Fig. 4, the segment through which the cage 33 may be adjusted without destroying the operability of the unit, has an angular extent of 92°; with the rotor of Fig. 5, that segment has an angular extent of 80°; and with rotors in which the angles defined between their shank axes and their head axes are of still other values, the available segments of adjustment will have correspondingly variable angular extents, the width of the available segment decreasing as the angle defined between the head axis and the shank axis of the rotor increases.

A phenomenon inherent in the described structure and which is of considerable value in numerous tyes of installations to which my motion converter is applicable, lies in the fact that, in every position of the cage 33 except that in which the line of reciprocation of the guide 41 is parallel with the axis of the shank 18, the degree of rotation of the rotor corresponding to the movement of the guide from one end of its path to the other is different from the degree of rotation of the rotor corresponding to return movement of the guide to its starting point. That is, in most mechanisms constructed to convert rotary motion to reciprocatory motion or vice versa, a given extent of motion by the reciprocator will be accompanied by the same degree of rotation of the rotor, whether the reciprocatory motion be in one direction or in the opposite direction. Usually, movement of the reciprocator of such a mechanism from one extremity of its stroke to the opposite extremity thereof is accompanied by movement of the rotor through 180°, and when the reciprocator then returns to its starting point, the rotor moves through a further 180°.

In my unit, on the other hand, except when the cage is located to make the guide 41 move parallel to the rotor shank axis, movement of the reciprocator in one direction will be accompanied by a greater degree of rotation of the rotor than will a movement of the reciprocator to the same extent in the opposite direction. For instance, using the rotor of Fig. 4, and with the cage so set that the line of movement of the guide 41 defines an angle of 46° with the rotor shank axis, the rotor will turn through 235° as the guide moves from the right-hand end of its path to the left-hand end thereof; but will turn through only 125° as the guide returns to the right-hand limit of its stroke.

The value of this phenomenon when the converter is incorporated in an internal combustion engine will at once be apparent. If the converter is so installed that travel of the guide 41 toward the left accompanies enlargement of the combustion chamber, it will be seen that the power of the explosion in that chamber can thus be applied continuously throughout 235° of rotation of the engine crank shaft, with an obviously resultant gain in the over-all efficiency of the engine. Alternatively, if the converter is incorporated in a pump, this phenomenon will be seen to be of enormous advantage. In such an installation, of course, the wheel 22 will be externally driven (by, for instance, a constant-speed motor) and the guide 41 will be operatively connected to the pump piston so that left-hand movement of said guide produces the compression stroke of the piston. Since the wheel 22 will rotate at constant speed, and since 235° of rotation thereof is required to move the pump piston through its compression stroke while only 125° of rotation of said wheel produces the return piston stroke, it will be seen that the compression stroke of the piston will be relatively slow and powerful, while the intake stroke (for which much less power is required) will be relatively quick.

The degree of this differential is increased as the angle defined between the axis of the rotor shank and the axis of the rotor head is increased. Thus, with the rotor of Fig. 5, in which that angle is 30°, as compared with 20° in the rotor of Figs. 1-4, and with the cage so set that the line of movement of the guide 41 defines a 40° angle with the axis of the shank 18; movement of the guide 41 from the right-hand end of its stroke to the left-hand end thereof is accompanied by 260° of rotation of the rotor 17; while return movement of said guide is accompanied by 100° of rotation of said rotor.

Adjustment of the position of the cage 33 relative to the axis of the rotor shank likewise varies this differential, the differential increasing as the angle defined between the line of movement of the reciprocator and the axis of the rotor shank decreases. Thus, reverting to the rotor of Figs. 1-4, if the cage 33 be adjusted so that the angle defined between the line of movement of the guide 41 and the axis of the shank 18 is 28½°, then movement of said guide from the right-hand end of its stroke to the left-hand end thereof will be accompanied by 190° of rotation of the rotor 17, while return movement of said guide will be accompanied by 170° of rotation of the rotor. If the line of movement of the reciprocator is brought into parallelism with the axis of the shaft 18, by further adjustment of the cage 33, the differential will be reduced to 0, and the rotor will turn through 180° with movement of the reciprocator from either end of its stroke to the other end thereof.

Similarly, if the rotor 17 is used, and if the cage 33 is so set that the line of movement of the guide 41 defines with the axis of the rotor shank 18 an angle of 28½°; then movement of the guide 41 from the right-hand end of its stroke to the left-hand end thereof will be accompanied by 205° of rotation of the rotor, while the return stroke of said guide will be accompanied by 155° of rotation of the rotor.

If the cage 33 is adjusted past the position of parallelism between the line of movement of the reciprocator and the axis of the rotor, the differential above discussed will be reversed, and movement of the reciprocator from the left-hand end of its stroke to the right-hand end thereof will be accompanied by a greater degree of movement of the rotor than will be movement of said reciprocator from the right-hand end of its stroke to the left-hand end thereof.

Both of these variable angles likewise affect the length of the stroke of the reciprocator. The greater the angle defined between the shank axis and the head axis of the rotor, the longer will be the stroke of the reciprocator for any given setting of the cage; and the greater the angle defined between the line of movement of the reciprocator and the axis of the rotor shank, the longer will be the stroke of the reciprocator. Thus, in the mechanism tested, a rotor constructed with a 20° angle between the axes of its shank and head produced a reciprocator stroke of $1\frac{5}{16}''$ (one and five-sixteenths inches) when the cage was set to define an angle of 28½° between the rotor shank axis and the line of movement of the reciprocator; while with the same cage setting, an otherwise identical rotor constructed with a 30° angle between the axes of its shank and head produced a reciprocator stroke of $2\frac{1}{8}''$. Also, the rotor which produced a reciprocator stroke of $1\frac{5}{16}''$ with a 28½° cage setting produced a reciprocator stroke of $1\frac{3}{4}''$, with a 46° cage setting; while the rotor which produced a reciprocator stroke of $2\frac{1}{8}''$ with a 28½° cage setting produced a reciprocator stroke of $2\frac{11}{16}''$ with a 40° cage setting.

The action hereinabove described is due, of course, to the wobbling of the ring 26, the oscillation of said ring about the axis of the surface 23 or 23', and the reciprocation and oscillation of the post 27 or 27' relative to the pintle 44. Needless to say, the details of construction of the means for confining the post 27 or 27' to oscillatory movement in a plane are unimportant to my invention; as are the particular means for determining the position of that plane. So long as the post is restricted by any means whatsoever to oscillation in a single plane, within the limits of a segment which is bisected by the axis of rotation of the rotor and whose angular extent is determined in accordance with the angular relation between the axes of the shank and the head of the rotor, the unit will convert rotary motion into reciprocatory motion, or vice versa, in accordance with the principles and characteristics above outlined.

For each value of the angular relation between the axes of the shank and head of a selected rotor, there is a maximum limit to the angular extent of such segment, beyond which the unit becomes inoperative. It is to be noted, also, that there are operative limits to the angular relation between said axes of the rotor shank and head. Thus, it is obvious upon inspection that if such axes are aligned, so that the angular relation therebetween is 0° or 180°, rotation of the rotor will not result in oscillation of the post 27—that is, the stroke of the reciprocator will become 0. Even an infinitesimal misalignment of said axes, however—an angular relation therebetween of only a fraction of a degree—will begin to produce a motion-converting action. Such action will, of course, be tiny in degree if the angle between said axes is small, but will increase as the angle defined between said axes is increased.

Inspection, too, will demonstrate that an angular relation of 90° between said axes will constitute an inoperative structure, and that structures in which that relation is less than, but close to, 90° will be quite inefficient, though operative. It is my present belief that rotors in which the angle defined between the axes of the shank and head is greater than 45° or less than 15° will produce structures too inefficient to be practical; and that optimum values for such angle lie within the range between 20° and 40°.

I claim:

1. A mechanical movement for effecting a conversion between rotary and reciprocatory motion in either direction, comprising a shaft, means supporting said shaft for rotation about its axis, said shaft being formed to provide a journal surface whose axis meets said shaft axis in an acute angle, an element projecting radially with respect to said journal surface, said element being journal-mounted on said journal surface for relative rotation therebetween, and means operatively associated with said element to restrict oscillatory motion of said element to a predetermined plane, and a support for said last-named means, said last-named means being adjustable on said support to locate said plane at any desired position within a segment bisected by the axis of said shaft and having an angular extent inversely variable in accordance with said acute angle.

2. A mechanical movement for effecting a conversion between rotary and reciprocatory motion in either direction, comprising a shaft, means supporting said shaft for rotation about its axis, said shaft being formed to provide a journal surface whose axis meets said shaft axis in an acute angle, an element projecting radially with respect to said journal surface, said element being journal-mounted on said journal surface for relative rotation therebetween, rectilinear guide means cooperatively engaging said element to restrict oscillatory motion of said element to a predetermined plane, and a journal mounting for said guide means, said journal mounting being disposed on an axis intersecting said shaft and journal surface axes at their point of intersection, and said guide means being adjustable about said journal mounting to locate said plane at any desired position within a segment bisected by the axis of said shaft and having an angular extent inversely variable in accordance with said acute angle.

FRED A. LANE.

REFERENCES CITED

The following references are of record in the file of this patent:

UNITED STATES PATENTS

| Number | Name | Date |
| --- | --- | --- |
| 1,134,155 | Phifer | Apr. 6, 1915 |
| 1,188,016 | Slonecker | June 20, 1916 |